United States Patent [19]

Sanders et al.

[11] Patent Number: 5,580,189
[45] Date of Patent: Dec. 3, 1996

[54] JACK-UP RIG CRANE

[75] Inventors: Ronald E. Sanders, Covington, La.; George Delamatyr, Corpus Christi, Tex.; Avis Bourg, Covington, La.

[73] Assignee: Searex, Inc., Covington, La.

[21] Appl. No.: 577,721

[22] Filed: Dec. 22, 1995

[51] Int. Cl.⁶ .................. E02B 17/08; B66C 23/52
[52] U.S. Cl. ............ 405/198; 212/307; 405/195.1; 405/196
[58] Field of Search .................. 405/195.1, 202, 405/204, 203, 205, 208; 212/307–311, 253

[56] References Cited

U.S. PATENT DOCUMENTS

| | | | |
|---|---|---|---|
| 1,697,261 | 1/1929 | Daughs | 212/307 X |
| 4,011,955 | 3/1977 | Morrow et al. | 212/309 |
| 4,417,664 | 11/1983 | Gordon | 405/200 X |
| 4,482,272 | 11/1984 | Colin | 405/198 |
| 4,505,616 | 3/1985 | Grzelka et al. | 405/198 |
| 4,589,799 | 5/1986 | Hotta et al. | 405/196 |
| 4,627,768 | 12/1986 | Thomas et al. | 405/198 |
| 4,652,177 | 3/1987 | Gunther, Jr. et al. | 405/196 |
| 4,722,640 | 2/1988 | Letourneau | 405/196 |
| 4,813,814 | 3/1989 | Shibuta et al. | 405/198 |
| 4,892,202 | 1/1990 | Hey et al. | 212/309 |
| 5,092,712 | 3/1992 | Goldman et al. | 405/196 |
| 5,102,264 | 4/1992 | Thomas et al. | 405/198 |
| 5,139,366 | 8/1992 | Choate et al. | 405/198 |
| 5,224,798 | 7/1993 | Thomas et al. | 405/198 |

FOREIGN PATENT DOCUMENTS

| | | | |
|---|---|---|---|
| 8501248 | 12/1986 | Netherlands | 212/307 |
| 2064624 | 6/1981 | United Kingdom | 405/198 |

*Primary Examiner*—Dennis L. Taylor
*Attorney, Agent, or Firm*—Pravel, Hewitt, Kimball & Krieger

[57] ABSTRACT

A boat lifting crane includes an annular ring beam mounted on the barge deck of a jack-up rig about one of the vertical openings of the rig that receives one of the legs and its elevating units. The ring provides spacing away from the leg, its opening and its elevating unit so that the ring derives all of its structural integrity from the barge or hull of the jack-up unit. The ring provides upper and lower bearing surface portions. A crane gantry extends about a selected one of the legs and its adjacent elevating units of the jack-up rig, the gantry having front and rear portions. A boom pivotally mounts to the front portion of the gantry. Roller bearings and/or other friction reduction devices on the front portion of the gantry transfer load to the ring upper surface. Hook rollers and/or other friction reduction devices on the rear portion of the gantry transfer uplift load to the ring at the ring lower surface. The ring and the gantry are sized and shaped so that the gantry can rotate fully about the leg without interfering with the operation of the leg nor with the structural integrity of the jack-up units used to elevate the leg.

11 Claims, 5 Drawing Sheets

JACK-UP RIG CRANE

BACKGROUND OF THE INVENTION

1. Field of the Invention

The present invention relates to lifting cranes and more particularly to lifting cranes for use on jack-up type drilling rigs and lift boats and the like wherein the rig includes a barge that can be lifted above the water's surface on legs and wherein the crane fits on the deck of the barge about the leg, but spaced from the leg and its adjacent jacking structure. Even more particularly, the present invention relates to an improved jack-up rig crane that utilizes a support ring beam having an L-shaped cross-section that is mounted structurally to the barge about the leg elevating units but spaced therefrom so that the ring beam develops all structural load of the crane gantry, boom and live load through the barge deck. A crane gantry mounts upon the ring but about the leg and jacking structure. Roller bearings engage the front and rear portion of the gantry for transferring load to the ring. A lift boat is a self-propelled, self elevating vessels generally with a clear deck, personnel quarters, and a lifting crane.

2. General Background

Lift boats are well known in the art. These devices include a floating hull that allows the boat to be transferred from one marine location to another. When the hull reaches a desired location, such as a proposed oil well, typically three or four legs are lowered from the barge to the sea bed. These legs are then powered downwardly to lift the hull vertically on the legs and above the water's surface.

Once in operating position, a jack-up rig presents a stable platform surface for oil and gas well drilling operations, work over operations, repair work etc., notwithstanding the wave action at the water surface below.

There have been many patents that have issued relating to jack-up rigs. An example of a recent patent that covers a jack-up rig is U.S. Pat. No. 5,139,366 issued to Kenneth Choate and John Laird entitled "OFFSHORE JACK-UP RIG LOCKING APPARATUS AND METHOD". The Choate patent provides a locking apparatus and method for an offshore jack-up rig having at least one leg extending through the hull and at least one set of rack teeth attached to each of the legs. One or more locking bars are supported from the hull and are movable in a direction substantially normal to the face of the rack teeth. A piston and cylinder power assembly moves the bars towards the teeth and a retention system engages the bars holding them in engagement with the teeth. The elevating system of the rig co-acts with the set bars to lock the hull and legs together.

Another recent patent that relates to jack-up rigs and explains there operation is U.S. Pat. No. 4,813,814 entitled "LEG-HOLDING DEVICE FOR OFFSHORE PLATFORM".

Other examples of patents that have issued and relate generally to jack-up rigs include the LeTourneau U.S. Pat. No. 4,722,640; Thomas U.S. Pat. No. 4,627,768; the Hotta U.S. Pat. No. 4,589,799; the Grzelks U.S. Pat. No. 4,505,616; and the Colin U.S. Pat. No. 4,482,272.

A patent that illustrates the elevating and lowering of a jack-up rig in a marine environment is the Thomas patent (see FIGS. 4a–4f) U.S. Pat. No. 5,224,798, entitled "OVERLOADING DEVICE FOR A JACK-UP OIL PLATFORM AND PLATFORM INCLUDING THE DEVICE".

Each of these jack-up type platforms presents a unique problem for the user, namely that of lack of space. Jack-up rigs are normally used in oil and gas well drilling. The deck of such vessels is thus required to carry a derrick for oil and gas well drilling operations, racks of drill pipe for use in the oil and gas well drilling operations, drilling mud and related chemicals that are used in the drilling operation as well as pumps, motors, fuel supply and the like. In short, space is in high demand on a jack-up rigs.

One of the essential elements of a lift boat is a lifting crane that can be used to lift supplies from its own deck, work boat, supply boat or the like, and place those supplies on the platform. Some years ago, a patented crane apparatus was designed to fit over the leg of a smaller sized lift boat wherein the leg was of a cylindrical pipe configuration. The Gordon U.S. Pat. No. 4,417,664 disclosed generally the concept of mounting a crane having a gantry and a boom about the leg of a lift boat.

Another patent that addressed the problem of mounting a crane on a jack-up rig (lift boat) where there is limited space is the Gunther, Jr. et al. U.S. Pat. No. 4,652,177. This patent proposes to mount the crane on the jacking structure or jacking tower of the jack-up rig (lift boat). However, such an arrangement presents a support for only very lightweight cranes and does not address the problem of mounting a very substantial crane on a much larger jack-up rig wherein the legs each have a truss-like triangular configuration or large cylindrical legs. It is to this problem that the present invention is directed.

SUMMARY OF THE INVENTION

The present invention solves the prior art problems and shortcomings of providing a lift crane apparatus that can be used on large jack-up rigs or lift boats, even the type that have truss style triangular legs with toothed racks on the legs and with separate jacking towers for each of the toothed racks.

The present invention provides a jack-up type marine vessel for use in a body of water having a sea bed and a water surface. The apparatus includes a barge having a deck with an upper surface and a plurality of generally vertical openings spaced about the barge. Each of the vertical openings provides a channel through which one of the legs passes during use.

A plurality of legs extends respectively through the barge at the vertical openings. Each of the legs is a truss-like leg having a plurality of vertical members, a plurality of horizontal members, and a plurality of diagonal members forming a leg in the form of a truss or cylindrical legs.

A plurality of elevating units is positioned respectively at the barge openings for changing the elevation of the barge relative to the legs. Each of the elevating units is positioned to lift the barge free of the water surface when the legs engage the seabed.

A ring beam is mounted on the barge deck about one of the vertical openings. The ring being spaced radially from the vertical opening and its elevating unit. The ring beam is Tee shaped in radial cross section and provides upper and lower bearing surface portions.

A crane gantry extends about a selected one of the legs and the adjacent elevating units. The ring is thus spaced from the structure of the jacking or elevating units and the associated leg thus deriving its structural integrity from the barge deck and/or substructure. The gantry has front and rear portions. A boom is pivotally mounted to the front portion of the gantry.

A plurality of roller bearings and/or other friction reduction devices on the front portion of the gantry transfer load to the ring at the ring upper bearing surface.

A plurality of roller bearings and/or other friction reduction devices on the rear portion of the gantry transfer load to the ring at the lower bearing surface.

Rigging is providing for interfacing the gantry and the boom. The rigging includes for examples sheaves and a plurality of wraps of wire rope.

The gantry and boom are rotatable upon the ring and independently of the leg and its elevating unit. The ring is structurally anchored to the barge and independently of the leg and its elevating unit.

BRIEF DESCRIPTION OF THE DRAWINGS

For a further understanding of the nature and objects of the present invention, reference should be made to the following detailed description, taken in conjunction with the accompanying drawings, in which like parts are given like reference numerals, and wherein.

DETAILED DESCRIPTION OF THE PREFERRED EMBODIMENT

Figure 1:
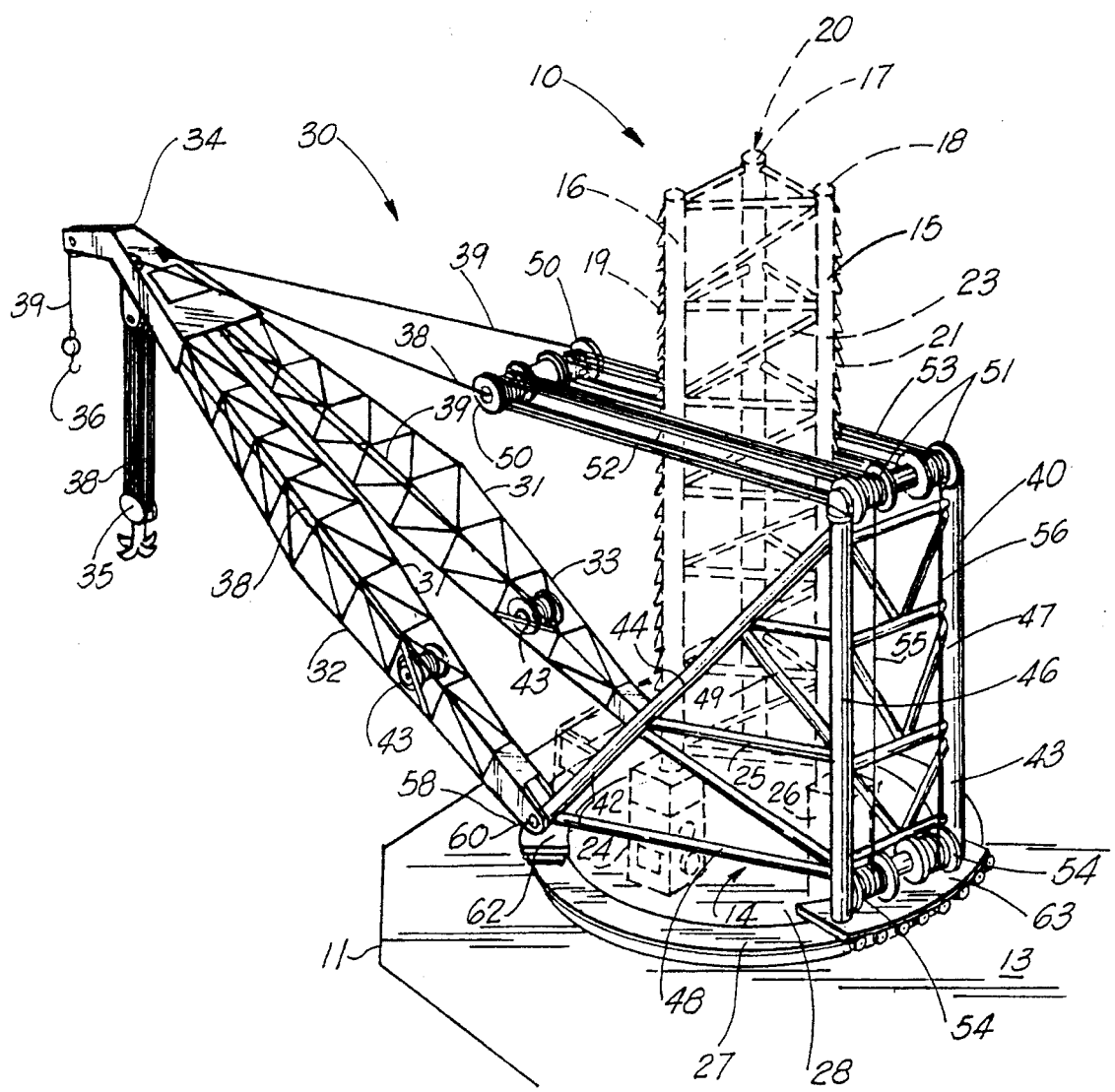
FIG. 1 is a perspective view of the preferred embodiment of the apparatus of the present invention.

As shown in FIG. 1, lifting apparatus 10 is associated with a jack-up rig 11 that includes a barge or hull 12. The barge 12 provides a deck surface 13 for workers and equipment. Barge 12 provides a plurality of vertically extending channels or openings 14 each having a leg 15 that extends therethrough.

Each leg includes a plurality of longitudinally extending beams 16–18. Each longitudinal beam 16–18 has a toothed rack 19–21 respectively. The leg 15 is comprised of the longitudinal beam 16–18, horizontal beams 22, and diagonal beams 23.

Elevating units 24–26 are associated respectively with the plurality of longitudinal beams 16–18 and the toothed racks 19–21 thereon. Typically, the elevating unit is a driven pinion gear (or a plurality of such gears) that engages the toothed racks 19–21 respectively.

Ring beam 27 is a circular supporting beam ring that extends about and is spaced from leg 15 and its plurality of elevating units 24–26. Ring beam 27 is welded or bolted to barge deck 13. An inside surface 28 of the barge deck 13 extends between the inside of ring 27 and the leg 15, its opening 14, and the elevating units 24–26. The remainder of the deck is designated in the drawings as the outside surface 29, that portion beyond the periphery of ring beam 27.

Crane 30 can be a double lifting boom 31 that includes boom sections 32–33. The boom 31 has a boom free end 34 that elevates and lowers a main hook 35 and an auxiliary hook 36. Lifting lines 38, 39 are rigged to the hooks 35, 36. The inner end of each boom 32, 33 mounts on ring beam 27.

Crane 30 includes a gantry that has a rear vertical frame and side vertical frames 42. The gantry 40 is comprised of a pair of primary diagonal members 44. The gantry also is comprised of vertical members 46, 47 horizontal member 48, secondary diagonal members 49.

The boom hoist double dangling sheave assembly 50 rigs between boom 30 and sheave assembly 51. Rigging lines 52–53 extend from double dangling sheave assembly 50 and double gantry sheave assemblies 51 as shown in FIG. 1. Double boom hoists 54 are rigged using rigging 55, 56 to double gantry sheave assemblies 51. Double main hoist 43 includes two powered winches as shown in FIG. 1 for powering main lift lines 38, 39.

Figure 2:
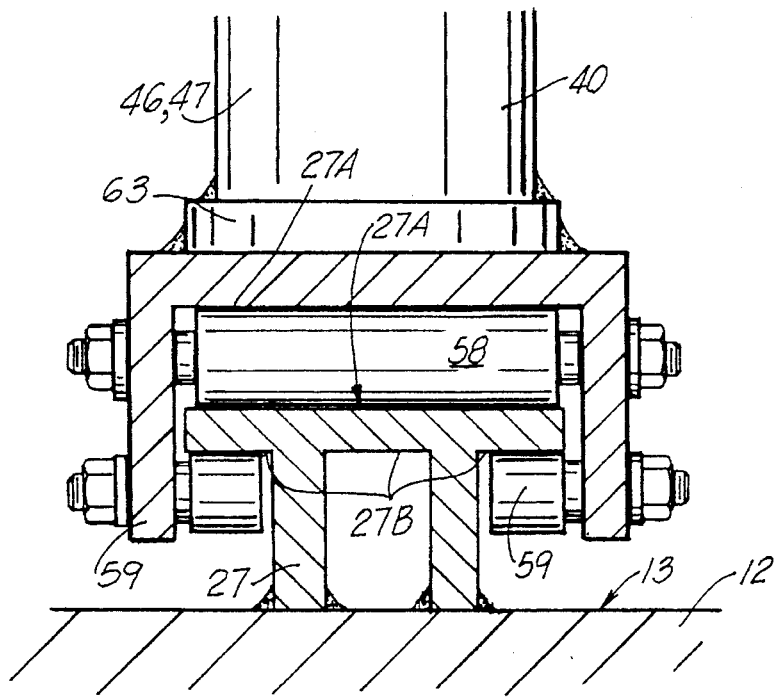
FIG. 2 is a fragmentary sectional view of the preferred embodiment of the apparatus of the present invention.

The gantry 40 rests and rotates upon ring 27. This is accomplished by a plurality of skid bearing rollers 58 and/or other friction reduction devices (see FIGS. 2–3) and a plurality of hook rollers 59 (see FIGS. 2–3) and/or other friction reduction devices. The skid bearing rollers 58 bear on the upper surface 27A of ring 27. The hook rollers 59 bear against undersurface 27B of beam 27 (see FIGS. 2–3).

Figure 3:
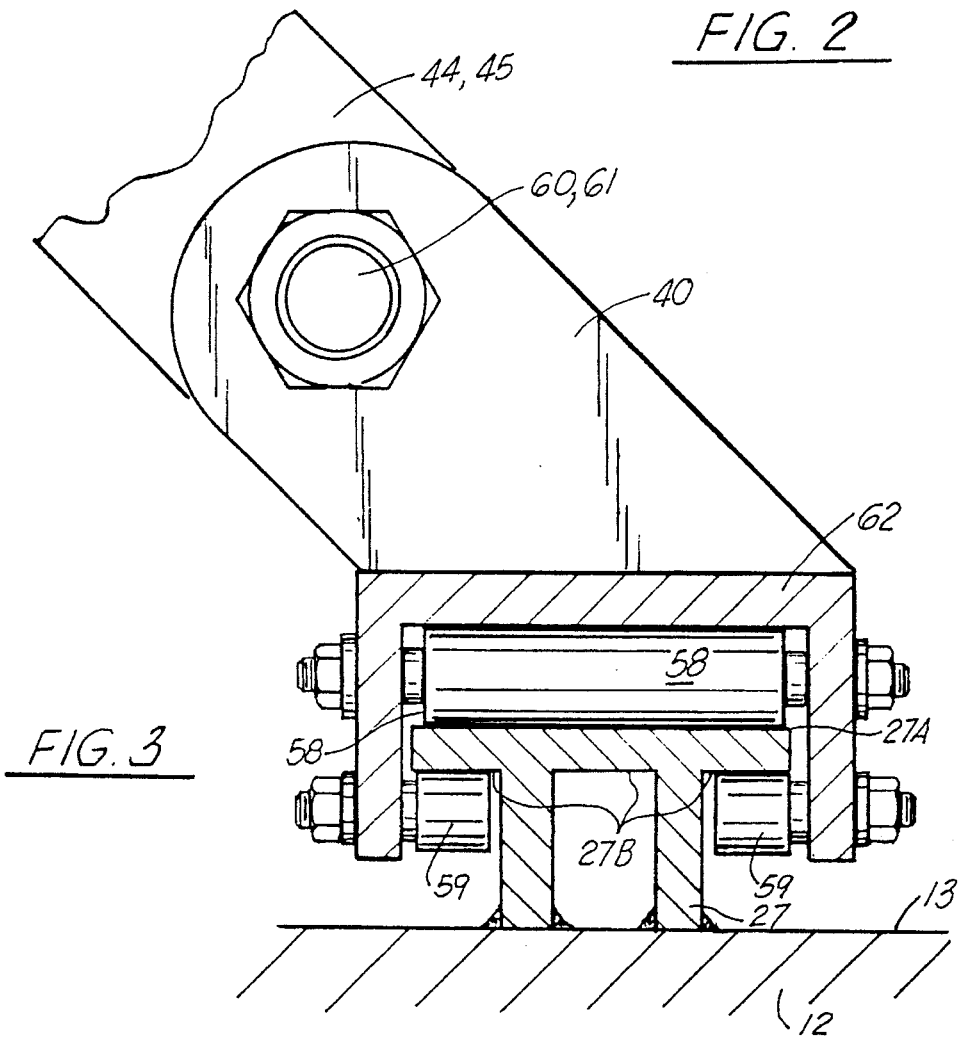
FIG. 3 is another fragmentary perspective view of the preferred embodiment of the apparatus of the present invention.

Boom 31 is pivotally connected to gantry 40 at boom heel pin connections 60, 61 immediately above the plurality bearing rollers 58 (see FIG. 3). The gantry 40 includes a horizontal bearing member 62 that defines the interface between gantry 40 at its front end portion and the plurality of skid bearing rollers 58. At the rear of gantry 40, surface 27B of beam 27 defines an interface between the gantry 40 and the plurality of hook rollers 59 (see FIG. 3). Gantry 40 and all of its rigging is spaced radially away from and clears both the leg 15 and its elevating units 24–26.

Figure 4:
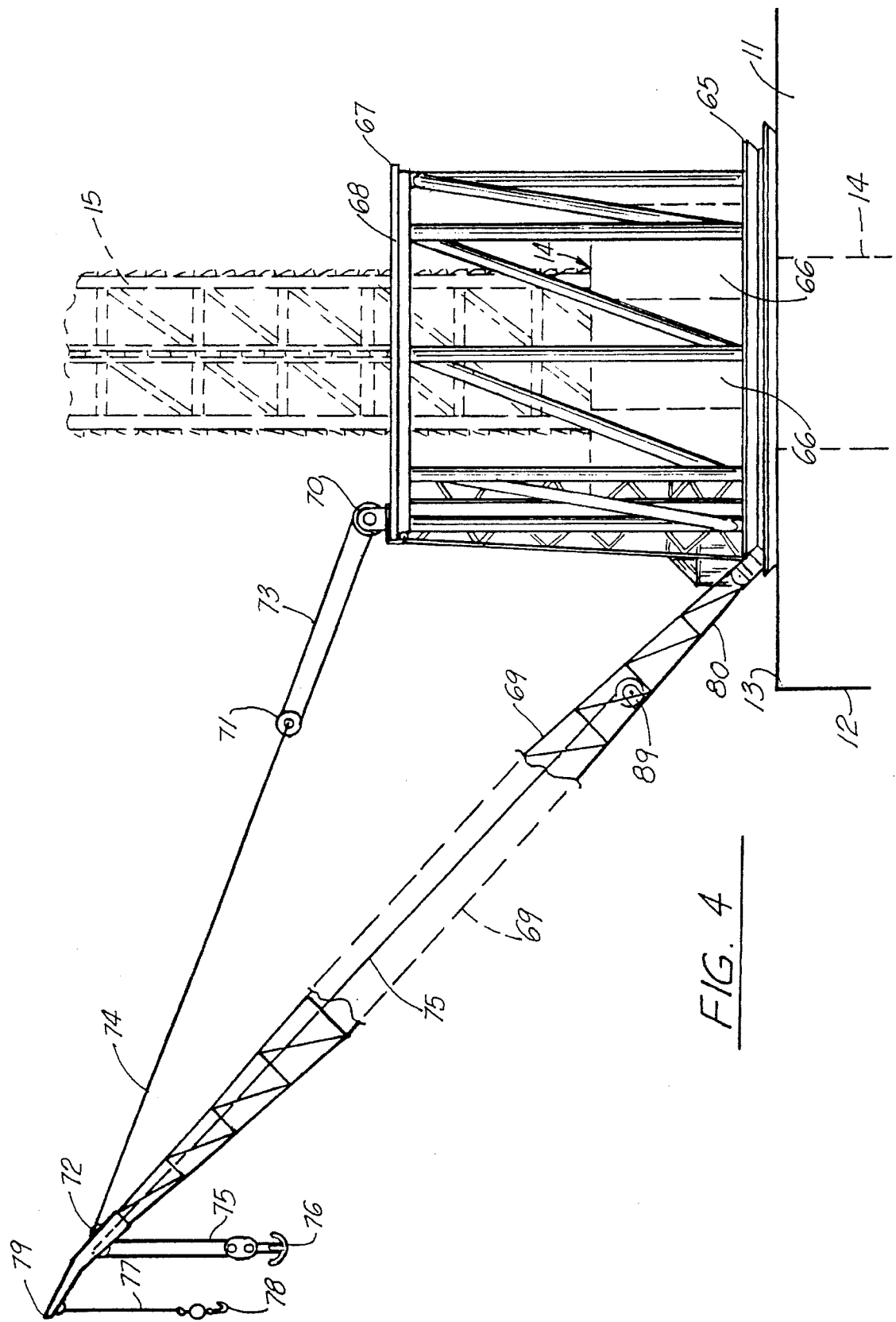
FIG. 4 is a elevational view of an alternate embodiment of the of the apparatus of the present invention.
Figure 5:
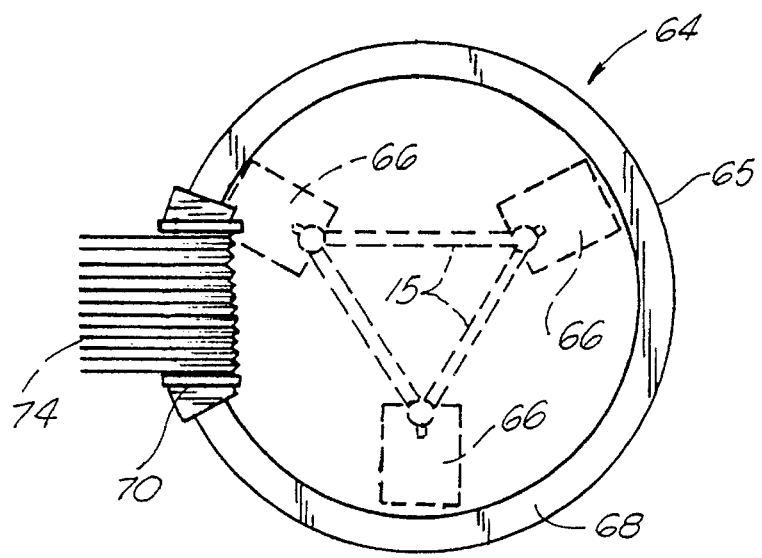
FIG. 5 is top view of the alternate embodiment of the apparatus of the present invention.

FIGS. 4–7 show an alternate embodiment of the apparatus of the present invention designated generally by the numeral 64. Lifting crane 64 is shown positioned upon a jack-up rig 11 that includes a barge portion 12 having a deck surface 13. An opening 14 in the deck accommodates an elongated leg 15 as with the preferred embodiment. Elevating units 66 can be used to raise and lower the leg 15 relative to the deck 12. Typically, such jack-up rigs 11 include three legs, each leg being triangular in shape as shown in FIG. 5. However, the legs may be cylindrical.

Figure 6:
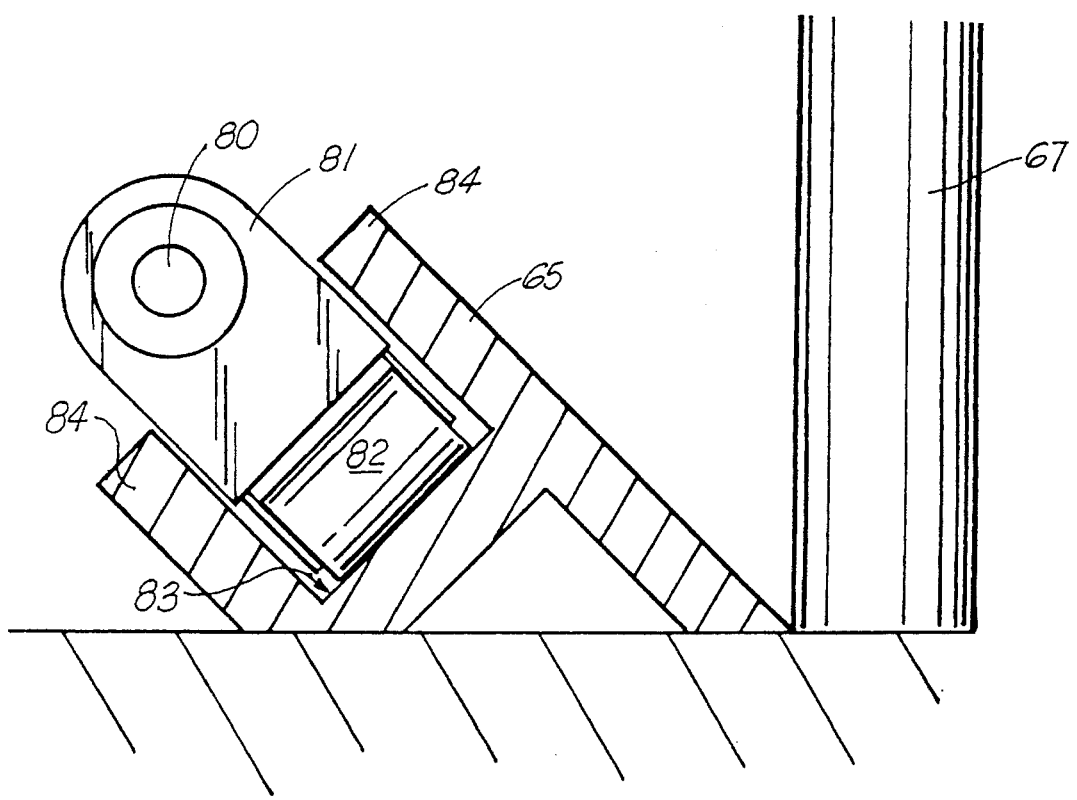
FIGS. 6–7 are fragmentary views of the alternate embodiment of the apparatus of the present invention.
Figure 7:
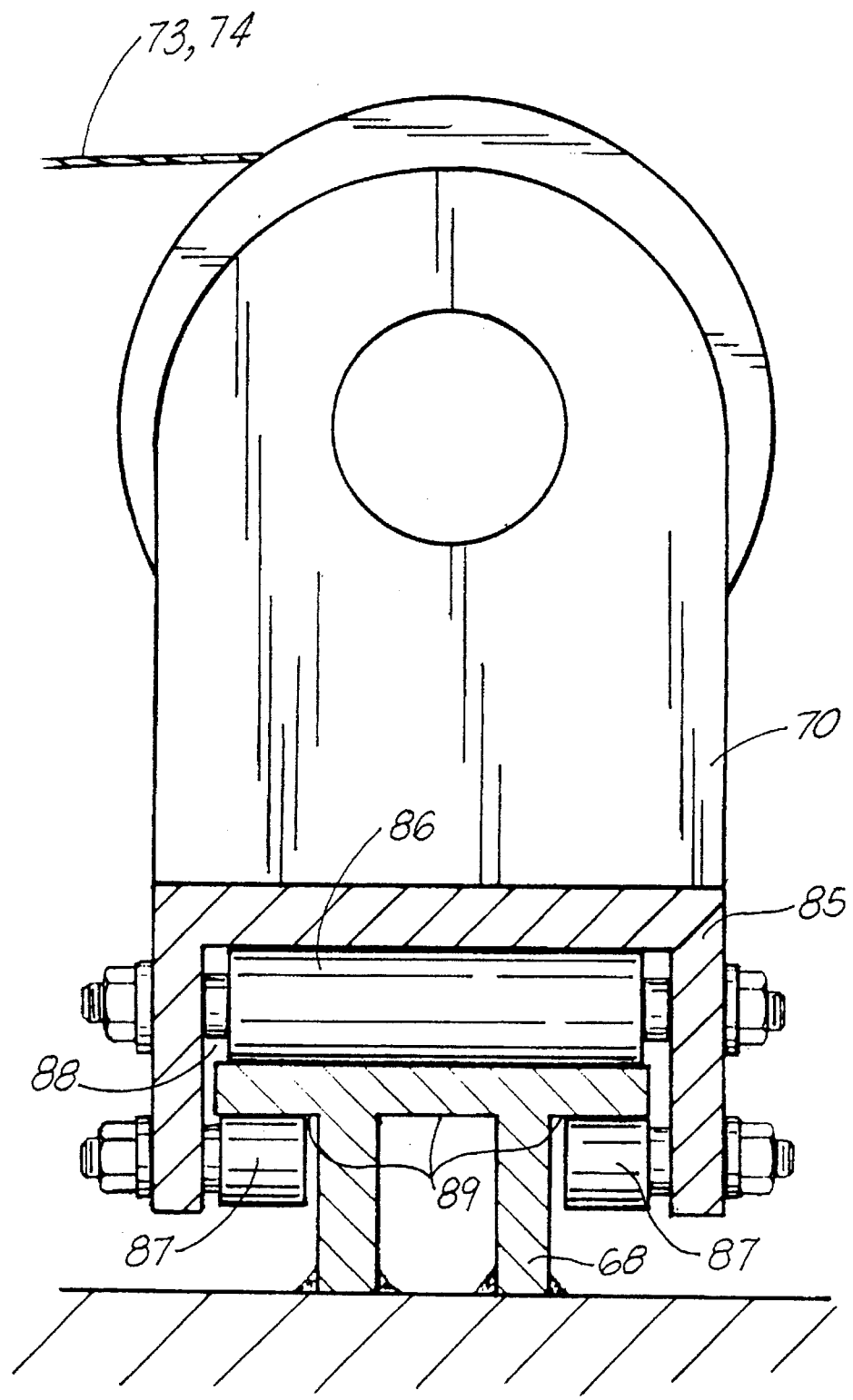

In the embodiment of FIG. 4, a ring beam 65 is provided, spaced radially from and surrounding the leg 15 and its elevating units 66. A cylindrically shaped gantry 67 extends between the ring beam 65 and an upper ring beam 68. A crane boom 69 rotates upon the base ring beam 65. Both boom 69 and gantry 67 are free of leg 15 and elevating units 66. Winch 70 rotates upon the upper ring beam 68 as shown in FIGS. 4 and 7. The winch 70 is rigged to one or more pulleys 71, 72 using rigging lines 73, 74. Lifting line 75 supports hook 76. Hoist 89 powers lifting line 75. Lifting line 77 supports lifting hook 78. The boom 69 has a free end 79 and a base or proximal end 80 that is pinned and thus pivoted with respect to traveling bearing assembly 81 (see FIG. 6). The bearing of assembly 81 has multiple roller bearings 82 that rest upon a bearing surface 83 of the base ring beam 65 as shown in FIG. 6.

In FIG. 7, winch 70 is movably mounted upon upper ring beam 68 that sits upon cylindrical truss 67. Roller assembly 85 carries a plurality of bearing rollers 86 and a plurality of hook rollers 87 as shown. The bearing rollers 86 bear against the upper surface 88 of upper ring beam 68. The hook rollers 87 bear against the under surface 89 of upper ring beam 68.

The following table lists the parts numbers and parts descriptions as used herein and in the drawings attached hereto.

| PARTS LIST | |
|---|---|
| Part Number | Description |
| 10 | lifting apparatus |
| 11 | jack-up rig |
| 12 | barge |
| 13 | barge deck surface |
| 14 | opening |
| 15 | leg |
| 16 | longitudinal beam |
| 17 | longitudinal beam |
| 18 | longitudinal beam |
| 19 | toothed rack |
| 20 | toothed rack |
| 21 | toothed rack |
| 22 | horizontal beam |
| 23 | diagonal beam |
| 24 | elevating unit |
| 25 | elevating unit |
| 26 | elevating unit |
| 27 | support ring |
| 28 | inside surface |
| 29 | outside surface |
| 30 | crane |
| 31 | double lifting boom |
| 32 | boom section |
| 33 | boom section |
| 34 | boom free end |
| 35 | main hook |
| 36 | auxiliary hook |
| 38 | lifting lines |
| 39 | lifting lines |
| 40 | gantry |
| 41 | rear vertical frame |
| 42 | side vertical frame |
| 43 | double main hoists |
| 44 | primary diagonal member |
| 46 | vertical member |
| 47 | vertical member |
| 48 | horizontal members |
| 49 | secondary diagonal member |
| 50 | double dangling sheave assembly |
| 51 | double gantry sheave assembly |
| 52 | rigging |
| 53 | rigging |
| 54 | double boom hoists |
| 55 | rigging |
| 56 | rigging |
| 57 | double main hoists |
| 58 | skid bearing rollers |
| 59 | hook rollers |
| 60 | pinned connection |
| 61 | pinned connection |
| 62 | horizontal bearing member |
| 63 | horizontal bearing member |
| 64 | lifting crane |
| 65 | ring beam |
| 66 | elevating unit |
| 67 | gantry |
| 68 | upper ring beam |
| 69 | boom |
| 70 | winch |
| 71 | pulley |
| 72 | pulley |
| 73 | rigging lines |
| 74 | rigging lines |
| 75 | lifting line |
| 76 | hook |
| 77 | lines |
| 78 | hook |
| 79 | free end |
| 80 | end |
| 81 | bearing assembly |
| 82 | roller bearings |
| 83 | bearing surface |
| 84 | flange |
| 85 | roller |
| 86 | roller |
| 87 | roller |

-continued

| PARTS LIST | |
|---|---|
| Part Number | Description |
| 88 | surface |
| 89 | hoist |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A jack-up type marine vessel comprising:
   a) a barge having a deck with an upper surface and a plurality of generally vertical openings spaced about the barge;
   b) a plurality of legs extending through the barge at the vertical openings;
   c) a plurality of elevating units positioned respectively on the barge at the openings for changing the elevation of the barge relative to the legs, each of the elevating units being powered to lift the barge free of the water surface when the legs engage the seabed;
   d) a ring beam mounted on the barge deck about one of the vertical openings spaced radially away from the vertical opening and its elevating unit, said ring having upper and lower bearing surface portions;
   e) a crane gantry that extends about a selected one of the legs and adjacent elevating units, said gantry having front and rear portions;
   f) a boom pivotally mounted to the front portion of the gantry the boom having rigging for lifting objects that transfer a boom load to the boom via the rigging;;
   g) a friction reduction device on the front portion of the gantry for transferring at least some of the boom load to the ring;
   h) a friction reduction device on the rear portion of the gantry for transferring at least some of the boom load to the ring at the ring lower surface;
   i) the rigging including a lifting hook for holding objects to be lifted; and
   j) the gantry and boom being rotatable upon the ring independently of the leg and its elevating unit, said ring being structurally anchored to the barge, and independently of the leg and its elevating unit.

2. The crane apparatus of claim 1 wherein each of the legs is a truss.

3. The crane apparatus of claim 1 wherein each of the legs is cylindrically shaped.

4. The crane apparatus of claim 1 wherein the ring beam is a circular ring having a tee shaped vertical cross section.

5. The crane apparatus of claim 1 wherein the gantry is a truss.

6. The crane apparatus of claim 5 wherein the gantry is a truss having diagonal and horizontal side members and a rear gantry portion that joins the side members.

7. The crane apparatus of claim 5 wherein the gantry is a truss having upper and lower spaced apart circular portions, the upper circular portion defining the ring beam.

8. The crane apparatus of claim 7 wherein the boom is mounted to the ring beam at the upper circular portion of the gantry.

9. The crane apparatus of claim 1 wherein the friction reduction device is comprised of a plurality of bearing rollers at the front portion of the gantry that bear on the upper bearing surface portion.

10. The crane apparatus of claim 1 wherein the friction reduction device is comprised of a plurality of rollers at the rear portion of the gantry that bear against the lower bearing surface portion.

11. A jack-up type marine vessel for use in a marine environment having a water's surface and a seabed comprising:

a) a barge having a deck with an upper surface and a plurality of generally vertical openings spaced about the barge;

b) a plurality of movable legs, each extending through a barge vertical opening;

c) a plurality of elevating units positioned respectively on the barge at the vertical openings for changing the elevation of the legs relative to the barge, each of the elevating units being powered to lift the barge free of the water's surface when the legs engage the underlying seabed;

d) a ring beam mounted on the barge deck about one of the vertical openings, the ring beam being spaced radially away from the vertical opening and its elevating unit, said ring beam having upper and lower bearing surface portions;

e) a crane gantry that extends about a selected one of the legs and adjacent elevating units, said gantry having front and rear portions and being spaced radially away from the leg and its elevating unit;

f) a boom pivotally mounted to the front portion of the crane gantry, the boom having rigging for lifting objects that transfer a boom load to the boom via the rigging;

g) a plurality of friction reduction devices on the front portion of the gantry for transferring at least some of the boom load to the ring as the gantry rotates relative to the barge;

h) a plurality of friction reduction devices on the rear portion of the gantry for transferring at least some of the boom load to the ring at the ring lower surface as the gantry rotates relative to the barge;

i) the rigging including a lifting hook for holding objects to be lifted; and j) the gantry and boom being rotatable upon the ring independently of the leg and its elevating unit, said ring being structurally anchored to the barge, and independently of the leg and its elevating unit.

* * * * *